United States Patent [19]
Cornell
[11] 3,863,155
[45] Jan. 28, 1975

[54] MULTIPATH RECEPTION SIMULATOR

[75] Inventor: Thomas V. Cornell, Kokomo, Ind.
[73] Assignee: General Motors Corporation, Detroit, Mich.

[22] Filed: June 18, 1973
[21] Appl. No.: 371,281

[52] U.S. Cl. .................... 325/67, 325/363, 328/167
[51] Int. Cl. .................... H04b 1/00
[58] Field of Search .............. 325/67, 363, 7, 9, 11; 328/162, 163, 167, 188, 187; 332/18, 20; 343/17.7; 35/10.4; 324/77 CS, 77 R

[56] References Cited
UNITED STATES PATENTS

| | | | |
|---|---|---|---|
| 3,319,188 | 5/1967 | Brutsch | 332/18 X |
| 3,369,180 | 2/1968 | Renkowitz | 325/11 |
| 3,596,182 | 7/1971 | Menard | 325/67 |
| 3,761,825 | 9/1973 | Hill | 325/67 X |

*Primary Examiner*—Benedict V. Safourek
*Assistant Examiner*—Aristotelis M. Psitos
*Attorney, Agent, or Firm*—T. G. Jagodzinski

[57] ABSTRACT
A modulated signal comprising a modulation signal impressed upon a carrier signal is heterodyne converted downward to shift the frequency spectrum of the modulated signal into an intermediate frequency band located between a carrier frequency band containing the carrier frequency of the carrier signal and a modulation frequency band containing the modulation frequencies of the modulation signal. In the intermediate frequency band, the modulated signal is fed through a tuned bridge-T filter circuit having a generally V-shaped amplitude versus frequency response curve exhibiting a center frequency lying within the frequency spectrum of the modulated signal to amplitude and phase distort the modulated signal to simulate multipath reception. Preferably, the filter network is tuned by a voltage variable capacitor which responds to a unidirectionally varying control voltage to effectively sweep the V-shaped filter response curve through the frequency spectrum of the modulated signal to simulate movement of a receiving antenna through a multipath reception area. After introduction of the desired amplitude and phase distortion, the modulated signal is heterodyne converted upward to shift the frequency spectrum of the modulated signal back to the carrier frequency band.

5 Claims, 3 Drawing Figures

MULTIPATH RECEPTION SIMULATOR

DISCLOSURE

This invention relates to an apparatus for simulating the multipath reception of a modulated signal which is preferably a frequency modulated (FM) signal.

In FM reception, waves arriving at the receiving antenna comprise both waves received directly from the transmitting antenna and waves received indirectly from the transmitting antenna after reflection from an object in the vicinity of the receiving antenna. Since the length of the propagation paths of the direct and reflected waves is different, the phase of the direct and reflected waves at the receiving antenna is likewise different. The result is "multipath reception," a phenomena wherein the direct and reflected waves are vectorily summed at the receiving antenna to provide a distorted resultant signal.

Multipath reception is particularly acute in a vehicle carried FM radio receiver where the receiving antenna randomly travels into and out of areas of wave cancellation. As the receiving antenna passes through a multipath reception area, a highly selective attenuation notch sweeps through the frequency spectrum of the received FM signal causing both amplitude and phase distortion which is manifested by a brief burst of corresponding autio distortion from the radio speaker. The audio distortion is short-lived because the area of wave cancellation represents only a relatively short distance of antenna travel (e.g. 6 inches).

It will now be appreciated that for purposes of laboratory study as well as the evaluation and testing of FM radio receivers, it is often desired to simulate the effects of multipath reception. To fulfill this need, the present invention provides a simple but effective apparatus for simulating the multipath reception of an FM signal formed by impressing a modulation signal having various modulation frequencies residing within a modulation frequency band (i.e., the audio frequency band—15 Hz to 15 KHz) upon a carrier signal having a single carrier frequency residing within a carrier frequency band (i.e., the standard FM broadcast band—88.1 MHz to 107.9 KHz).

According to one aspect of the invention, the frequency spectrum of an FM signal is shifted from the carrier frequency band to an intermediate frequency band which is located between the carrier frequency and the modulation frequency band. Within the intermediate frequency band, the FM signal is processed so as to simulate multipath reception. Thereafter, the frequency spectrum of the FM signal is shifted from the intermediate frequency band back to the carrier frequency band. In an embodiment of this aspect of the invention, a first heterodyne converter initially shifts the FM signal downward into the intermediate frequency band while a second heterodyne converter subsequently shifts the FM signal upward into the carrier frequency band.

In another aspect of the invention, the FM signal is processed in accordance with a generally V-shaped amplitude versus frequency response curve exhibiting a point or center amplitude and a point or center frequency lying within the frequency spectrum of the FM signal for amplitude and phase distorting the FM signal so as to simulate multipath reception. In an embodiment of this aspect of the invention, the FM signal is fed through a tuned bridged-T filter circuit including a resistive element for defining the point amplitude of the V-shaped filter response curve as a function of the resistance of the resistive element and including a reactive element for defining the point frequency of the V-shaped filter response curve as a function of the reactance of the reactive element.

As contemplated by a further aspect of the invention, the point frequency of the V-shaped amplitude versus frequency response curve is variable in proportion to the amplitude of an applied control voltage. In an embodiment of this aspect of the invention, the reactive element of the filter circuit is provided by a voltage variable capacitor which is preferably a varactor diode.

In yet another aspect of the invention, the V-shaped amplitude versus frequency response curve is effectively swept through the frequency spectrum of the FM signal to simulate movement of a receiving antenna through an area of multipath reception. In an embodiment of this aspect of the invention, the amplitude of the control voltage unidirectionally varies in repetitive cycles as defined by a relaxation oscillator.

These and other aspects and advantages of the invention may be best understood by reference to the following detailed description of the preferred embodiments taken in conjunction with the accompanying drawing.

Figure 1:
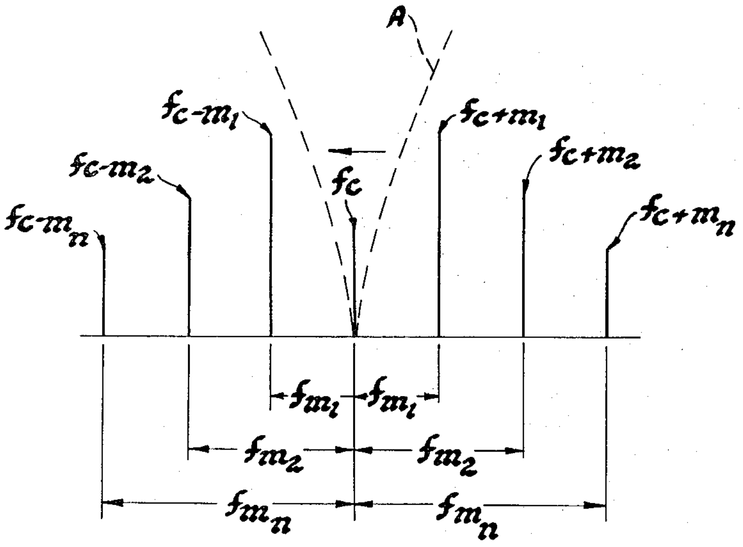
FIG. 1 is a graphic diagram of the frequency spectrum of a typical FM signal.

FIG. 1 illustrates the frequency spectrum, at a given instant in time, of a frequency modulated (FM) signal formed by impressing a modulation signal having various modulation frequencies $f_{m_1}$–$f_{m_n}$, preferably residing within the audio frequency band (i.e., 15 Hz-15 KHz), upon a carrier signal having a single carrier frequency $f_c$, preferably residing within the FM broadcast band (i.e., 88.1 MHz-107.9 MHz). The frequency spectrum of the FM signal includes the carrier frequency $f_c$, a set of upper sideband frequencies $f_{c+m_1}$–$f_{c+m_n}$ and a set of lower sideband frequencies $f_{c-m_1}$–$f_{c-m_n}$. The upper sideband frequencies $f_{c+m_1}$–$f_{c+m_n}$ represent the carrier frequency $f_c$ plus the various modulation frequencies $f_{m_1}$–$f_{m_n}$ present in the modulation signal at the instant shown. Likewise, the lower sideband frequencies $f_{c-m_1}$–$f_{c-m_n}$ represent the carrier frequency $f_c$ minus the various modulation frequencies $f_{m_1}$–$f_{m_n}$ present in the modulation signal at the instant shown. Hence, the frequency spectrum of the FM signal is centered about the carrier frequency $f_c$ and extends over twice the modulation frequency band as defined by the various modulation frequencies $f_{m_1}$–$f_{m_n}$ at the instant shown.

As previously described, "multipath reception" occurs when two identical FM signals emanating from the same transmitting antenna arrive at the same receiving antenna out of phase after traveling over propagation paths of different length. Usually, one of the waves is received directly from the transmitting antenna while the other of the waves is received indirectly from the transmitting antenna after reflection from an object in the vicinity of the receiving antenna. At the receiving antenna, the direct wave and the reflected wave are vectorily summed to produce a resultant signal which is both amplitude and phase distorted.

Figures 2, 3:
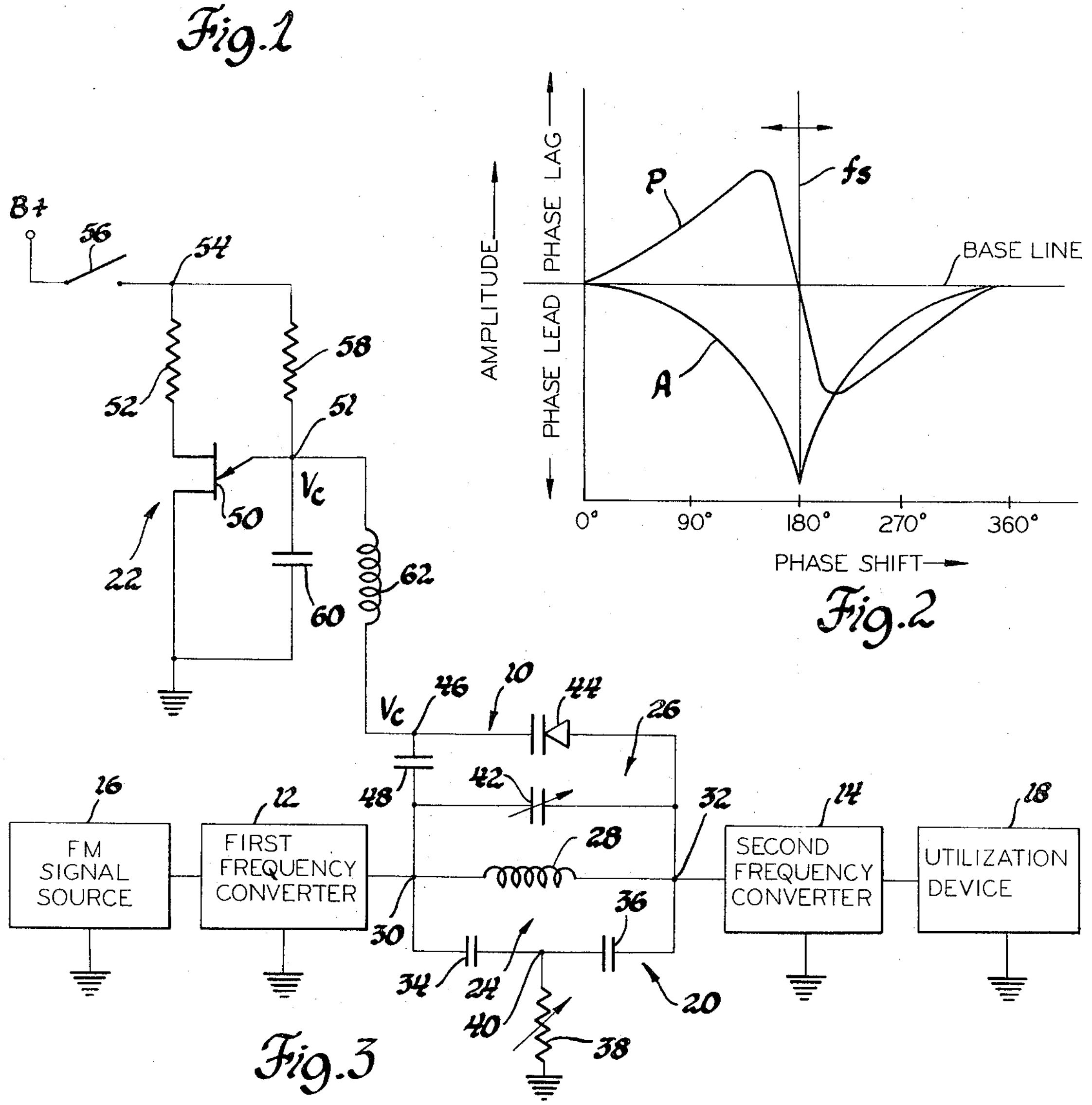
FIG. 2 is a graphic diagram of an amplitude versus frequency response curve useful in explaining the operation of the multipath reception simulator illustrated in FIG. 1.
FIG. 3 is a schematic diagram of a multipath reception simulator incorporating the principles of the invention.

A plot of the amplitude distortion curve A and the phase distortion curve P of a typical resultant signal produced by multipath reception is shown in FIG. 2. Specifically, the curve A represents the amplitude of the resultant signal as a function of the phase difference between the direct wave and the reflected wave. At a phase difference of 0° and 360°, the curve A is at a base line representing a maximum amplitude of the resultant signal. At a phase difference of 180°, the curve A is at a lower peak representing a minimum amplitude or a maximum attenuation of the resultant signal. Between a phase difference of 0° and 180°, the curve A initially gradually and subsequently rapidly decreases from the base line to the lower peak. Between a phase difference of 180° and 360°, the curve A initially rapidly and subsequently gradually increases from the lower peak back to the base line. Accordingly, the amplitude distortion curve A exhibits a generally V-shaped profile having a peak or point located at a phase difference of 180° between the direct wave and the reflected wave.

The curve P represents the phase shift of the resultant signal as a function of the phase difference between the direct wave and the reflected wave. Of course, the phase shift of the resultant signal is measured with respect to the phase of the direct wave. At a phase difference of 0° and 360°, the curve P is at the base line representing a minimum phase shift of the resultant signal (i.e., zero phase shift). Between a phase difference of 0° and 180°, the curve P initially gradually increases from the base line to an upper peak representing a maximum lagging phase shift of the resultant signal, and subsequently rapidly decreases back to the base line. At a phase difference of 180°, the phase shift of the resultant signal rather suddenly reverses from a lagging sense to a leading sense. Between a phase difference of 180° and 360°, the curve P initially rapidly decreases from the base line to a lower peak representing a maximum leading phase shift of the resultant signal, and subsequently gradually increases back to the base line. Consequently, the phase distortion curve P exhibits a generally N-shaped profile having a relatively sharp transition between upper and lower peaks located near a phase difference of 180° between the direct wave and the reflected wave.

Multipath reception is particularly acute in a vehicle carried FM radio receiver where the receiving antenna randomly travels into and out of areas of wave cancellation. As the receiving antenna passes through an area of multipath reception, the V-shaped amplitude distortion curve A, as illustrated in FIG. 2, is effectively swept through the frequency spectrum of the received FM signal, as illustrated in FIG. 1. Referring to FIG. 1, the amplitude distortion curve A is shown in relation to the frequency spectrum of the FM signal at an instant in time when the peak of the V-shaped curve A coincide with the carrier frequency $f_c$ of the FM signal. As the curve A sweeps through the frequency spectrum of the FM signal from the higher to lower frequencies, it produces an amplitude attenuation which, in turn, produces a phase reversal of the FM signal in accordance with the phase distortion curve P, as shown in FIG. 2. Due primarily to this phase reversal of the FM signal, a brief burst of audio distortion is emitted from the speaker of the FM radio receiver. The audio distortion is short-lived because the effective traverse of the phase transistion portion of the curve P through the frequency spectrum of the FM signal represents only a relatively short distance of antenna travel (i.e., 6 inches).

In order to accurately simulate the multipath reception of an FM signal, the represent invention provides an apparatus for substantially duplicating the amplitude distortion curve A and the corresponding phase distortion curve P. Further, the inventive apparatus is capable of effectively sweeping the duplicate amplitude and phase distortion curves A and P through the frequency spectrum of the FM signal to simulate movement of a receiving antenna through an area of multipath reception as occurs in a vehicle carried FM radio receiver.

Referring to FIG. 3, the apparatus of one embodiment of the invention comprises a distortion generator 10 which is coupled between first and second frequency converters 12 and 14. An FM signal source 16 is connected to the first frequency converter 12 for supplying an Fm signal to be distorted. The first frequency converter 12 shifts the frequency spectrum of the FM signal down within an intermediate frequency band located between the carrier frequency band and the modulation frequency band. In a manner to be more fully described later, the distortion generator 10 amplitude and phase distorts the FM signal to simulate multipath reception. The second frequency converter 14 shifts the frequency spectrum of the distorted FM signal back up within the carrier frequency band. A utilization device 18 is connected to the second frequency converter 14 for receiving the distorted FM signal.

Preferably, the frequency converters 12 and 14 are of the heterodyne type in which an applied signal is mixed with a reference signal to effectively reproduce the applied signal at a frequency equal to the difference between the frequency of the applied signal and the frequency of the reference signal. Conveniently, the FM signal source may be provided by the RF stage of an FM radio receiver while the first frequency converter 12 may be provided by the local oscillator stage, the mixer stage and the IF stage of the same radio receiver. In such event, the intermediate frequency band would be centered about a frequency of 10.7 MHz. The utilization device 18 may be provided by an FM radio receiver under test.

The distortion generator 10 includes a filter circuit 20 and an oscillator circuit 22. In turn, the filter circuit 20 includes a filter network 24 and a tuner network 26. The filter network 24 includes an inductor 28 connected between an input terminal 30 and an output terminal 32, a pair of capacitors 34 and 36 connected in series between the input terminal 30 and the output terminal 32, and an adjustable resistor 38 connected from a junction 40 between the capacitors 34 and 36 to ground. The tuner network 26 includes an adjustable capacitor 42 connected between the input terminal 30 and the output terminal 32. A voltage variable capacitor 44, preferably provided by a varactor diode, is connected between a junction 46 and the output terminal 32. A padder capacitor 48 is connected between the junction 46 and the input terminal 30.

The oscillator circuit 22 includes a unijunction transistor 50 having emitter, base one and base two electrodes. The emitter electrode is connected directly to a junction 21. The base one electrode is connected directly to ground. A load resistor 52 is connected between a junction 54 and the base two electrode of the transistor 50. A manually operable switch 56 is connected between the junction 54 and a source of positive direct current voltage B+ (not shown). A timing resistor 58 is connected between the junctions 51 and 54. A timing capacitor 60 is connected between the junction 51 and ground. A choke inductor 62 is connected between the junction 51 in the oscillator circuit 22 and the junction 46 in the tuner network 26 of the filter circuit 20.

The filter network 24 is an RLC bridged-T filter network of the type shown and described in *Electronic Designers Handbook*, by Robert W. Landee, Donovan C. Davis and Albert P. Albrecht, pages 16–20 thru 16–23, McGraw-Hill Co., 1957. As pointed out in this reference, the filter network 24 is characterized by an amplitude attenuation curve and a phase shift curve which are substantially identical to the amplitude and phase distortion curves A and P, respectively, as shown in FIG. 2. Accordingly, for purposes of discussion, the curve A will be taken as the amplitude attenuation curve of the filter network 24 while the curve P will be taken as the phase shift curve of the filter network 24. Referring to FIG. 2, the generally V-shaped amplitude attenuation curve A exhibits a maximum attenuation at a point or center frequency $f_s$ about which it is symmetrical. On the other hand, the generally N-shaped phase shift curve P exhibits a rather sudden phase reversal at the center frequency $f_s$ about which it is also symmetrical.

The tuner network 26 is connected in parallel to the filter network 24 for varying the center frequency $f_s$ of the amplitude attenuation curve A and of the phase shift curve P in response to variations in the total capacitance appearing between the input and output terminals 30 and 32. The absolute value of the capacitance developed across the tuner network 26 is primarily determined by the capacitance of the adjustable capacitor 42. On the other hand, relative changes in the capacitance appearing across the tuner network 26 is primarily determined by changes in the capacitance of the voltage variable capacitor 44 as defined in proportion to the amplitude of a control voltage $V_c$ applied at the junction 46. The capacitance of the padder capacitor 48 defines the precise magnitude of the resultant change produced in the capacitance of the tuner network 26 by a corresponding change in the capacitance of the voltage variable capacitor 44.

The control voltage $V_c$ applied to the junction 46 is developed across the capacitor 60 in the oscillator circuit 22. When the switch 56 is closed, the capacitor 60 is gradually charged through the resistor 58 to increase the amplitude of the control voltage $V_c$. When the amplitude of the control voltage $V_c$ reaches a set level at which the unijunction transistor 50 turns on, the capacitor 60 is rapidly discharged through the emitter-base one junction of the transistor 50 to decrease the amplitude of the control voltage $V_c$. The resistor 52 provides a load for the unijunction transistor 50. When the amplitude of the control voltage $V_c$ reaches a reset level at which the unijunction transistor 50 turns off, the capacitor 60 is again gradually charged to start another cycle of the control voltage $V_c$. The frequency of the sawtooth control voltage $V_c$ defined across the capacitor 60 is primarily determined by the RC time constant provided by the resistance of the resistor 58 and the capacitance of the capacitor 60. Preferably, the RC time constant is chosen such that the amplitude of the control voltage $V_c$ substantially linearly increases during each cycle. The choke conductor 62 applies the control voltage $V_c$ from the oscillator circuit 22 to the filter circuit 20, but it blocks the return flow of the FM signal from the filter circuit 20 to the oscillator circuit 22.

As the amplitude of the control voltage $V_c$ changes, the capacitance developed across the tuner network 26 likewise changes to shift the center frequency $f_s$ of the amplitude attenuation curve A and of the phase shift curve P. Further, since the amplitude of the control voltage $V_c$ unidirectionally varies during each cycle, the generally V-shaped amplitude attenuation curve A and the generally N-shaped phase shift curve P are effectively swept through the frequency spectrum of the FM signal as it passes through the filter network 24. Accordingly, the FM signal is amplitude and phase distorted as though it was received by an antenna passing through an area of multipath reception.

In a multipath reception simulator constructed in accordance with the illustrated embodiment of the invention, the following components and values were found to yields satisfactory results:

| Component | Value |
|---|---|
| Unijunction Transistor 50 | 2N1671 |
| Varactor Diode 44 | Delco DS-55, 1N3182 |
| Inductor 28 | 2 microhenries |
| Inductor 62 | 240 microhenries |
| Capacitors 34 and 36 | 150 picofarads |
| Capacitor 42 | 5–45 picofarads |
| Capacitor 48 | 22 microfarads |
| Capacitor 60 | 40 microfarads |
| Resistor 38 | 15 K ohms |
| Resistor 52 | 220 ohms |
| Resistor 58 | 68 K ohms |

It will now be apparent that the selectivity or quality factor Q of the filter network 24 must be sufficiently high to provide an amplitude attenuation curve A which is relatively narrow with respect to the frequency spectrum of the FM signal as shown in FIG. 1. To this end, the frequency conversion of the FM signal to an intermediate frequency band lowers the required selectivity of the filter network 24 such that the desired quality factor Q is relatively attainable through the use of ordinary components. In addition, it is to be noted that the control voltage $V_c$ need not be provided by the relaxation oscillator circuit 22, but rather, it may be provided by any suitably controllable source of direct current voltage, such as a potentiometer. Further, quite apart from the provision of the control voltage $V_c$, the center frequency $f_s$ of the phase and amplitude distortion curves A and P may be shifted by varying the capacitance of the capacitor 42 or the inductance of the inductor 28.

What is claimed is:

1. An apparatus for simulating the multipath reception of a modulated signal formed by impressing a modulation signal having various modulation frequencies residing within a modulation frequency band upon a carrier signal having a single carrier frequency residing within a carrier frequency band such that the modulated signal includes a frequency spectrum centered about the carrier frequency and extending within the carrier frequency band over twice the modulation frequency band, comprising: means for shifting the frequency spectrum of the modulated signal from the carrier frequency band to an intermediate frequency band located between the carrier frequency band and the modulation frequency band; means for translating the modulated signal in accordance with a generally V-shaped amplitude versus frequency response curve having a center frequency residing within the frequency spectrum of the modulated signal to amplitude and phase distort the modulated signal so as to simulate multipath reception; and means for shifting the frequency spectrum of the modulated signal from the intermediate frequency band back to the carrier frequency band.

2. An apparatus for simulating the multipath reception of a modulated signal formed by impressing a modulation signal having various modulation frequencies residing within a modulation frequency band upon a carrier signal having a single carrier frequency residing within a carrier frequency band such that the modulated signal includes a frequency spectrum centered about the carrier frequency and extending within the carrier frequency band over twice the modulation frequency band, comprising: means for shifting the frequency spectrum of the modulated signal from the carrier frequency band to an intermediate frequency band located between the carrier frequency band and the modulation frequency band; means including a filter network and a variable reactive element for providing a generally V-shaped amplitude versus frequency response curve having a center frequency which is defined as a function of the reactance of the reactive element such that the peak frequency resides within the frequency spectrum of the modulated signal to amplitude and phase distort the modulated signal so as to simulate multipath reception; and means for shifting the frequency spectrum of the modulated signal from the intermediate frequency band back to the carrier frequency band.

3. An apparatus for simulating the multipath reception of an FM signal formed by impressing a modulation signal having various modulation frequencies residing within a modulation frequency band upon a carrier signal having a single carrier frequency residing within a carrier frequency band such that the FM signal includes a frequency spectrum centered about the carrier frequency and extending within the carrier frequency band over twice the modulation frequency band, comprising: means including a first heterodyne converter for shifting the frequency spectrum of the FM signal from the carrier frequency band down within an intermediate frequency band located between the carrier frequency band and the modulation frequency band; means including a bridged-T filter network paralleled by a tuner network for providing a generally V-shaped amplitude versus frequency response curve exhibiting a peak amplitude and a peak frequency, the filter network including a resistive element for defining the peak amplitude of the response curve as a function of the resistance of the resistive element, and the tuner network including a variable reactive element for defining the peak frequency of the response curve as a function of the reactance of the reactive element such that the peak frequency resides within the frequency spectrum of the FM signal for amplitude and phase distorting the FM signal so as to simulate multipath reception; and means including a second heterodyne converter for shifting the frequency spectrum of the FM signal from the intermediate frequency band back up within the carrier frequency band.

4. An apparatus for simulating the multipath reception of an FM signal formed by impressing a modulation signal having various modulation frequencies residing within a modulation frequency band upon a carrier signal having a single carrier frequency residing within a carrier frequency band such that the FM signal exhibits a frequency spectrum centered about the carrier frequency and extending within the carrier frequency band over twice the modulation frequency band, comprising: means including a first heterodyne converter for shifting the frequency spectrum of the FM signal from the carrier frequency band down within an intermediate frequency band located between the carrier frequency band and the modulated frequency band; means including a voltage variable reactive element for providing a generally V-shaped amplitude versus frequency response curve having a point frequency defined in proportion to the amplitude of a control voltage applied to the reactive element; means for generating the control voltage and for varying the amplitude of the control voltage such that the V-shaped amplitude versus frequency response curve is effectively swept through the frequency spectrum of the FM signal to amplitude and phase distort the FM signal so as to simulate multipath reception; and means including a second heterodyne converter for shifting the frequency spectrum of the FM signal from the intermediate frequency band up within the carrier frequency band.

5. An apparatus for simulating the multipath reception of an FM signal formed by impressing a modulation signal having various modulation frequencies residing within the audio frequency band upon a carrier signal having a single carrier frequency residing within the FM broadcast band such that the FM signal includes a frequency spectrum centered about the carrier frequency and extending within the FM broadcast band over twice the audio frequency band, comprising: means including a first heterodyne converter for shifting the frequency spectrum of the FM signal from the FM broadcast band down within an intermediate frequency band located between the FM broadcast band and the audio frequency band; means including an RLC bridged-T filter network paralleled by a tuner network having a voltage variable capacitor for providing a generally V-shaped amplitude versus frequency response curve having a center frequency defined in proportion to the amplitude of a control voltage applied to the voltage variable capacitor; means including a relaxation oscillator for periodically generating the control voltage with a unidirectionally varying amplitude so that the V-shaped amplitude versus frequency response curve is effectively swept through the frequency spectrum of the FM signal to amplitude and phase distort the FM signal thereby to simulate multipath reception; and means including a second heterodyne converter for shifting the frequency spectrum of the FM signal from the intermediate frequency band up within the carrier frequency band.

* * * * *